United States Patent [19]
Spencer

[11] Patent Number: 5,842,668
[45] Date of Patent: Dec. 1, 1998

[54] QUICK FIT OVERHEAD STOWAGE COMPARTMENT

[75] Inventor: Martin C. Spencer, Bellingham, Wash.

[73] Assignee: Hexcel Corporation, Pleasanton, Calif.

[21] Appl. No.: 807,676

[22] Filed: Feb. 27, 1997

[51] Int. Cl.$^6$ .............................. B64C 1/22; B64D 11/00
[52] U.S. Cl. .................................. 244/118.1; 244/118.5; 244/119; 244/131; 248/222.51; 312/245; 312/246
[58] Field of Search .............................. 244/118.1, 118.5, 244/118.6, 119, 120, 131; 248/222.51, 320; 312/242, 246, 247, 248, 249.7, 245

[56] References Cited

U.S. PATENT DOCUMENTS

| | | | |
|---|---|---|---|
| 2,494,690 | 1/1950 | Cerny ..................................... | 244/118.1 |
| 2,551,305 | 5/1951 | Tompkins . | |
| 2,909,352 | 10/1959 | Buren, Jr. ........................ | 248/222.51 X |
| 3,102,607 | 9/1963 | Roberts . | |
| 3,162,497 | 12/1964 | Boswinkle et al. . | |
| 3,337,172 | 8/1967 | Jackson .............................. | 248/222.51 |
| 3,443,851 | 5/1969 | Earl . | |
| 3,700,199 | 10/1972 | Matuska ................................ | 244/118.1 |
| 4,275,942 | 6/1981 | Steidl . | |
| 4,368,937 | 1/1983 | Palombo et al. . | |
| 4,490,883 | 1/1985 | Gauron . | |
| 4,799,631 | 1/1989 | Humphries et al. . | |
| 4,907,762 | 3/1990 | Bock et al. . | |
| 4,947,762 | 8/1990 | Perzl et al. . | |
| 5,039,902 | 8/1991 | Schwarz .............................. | 248/320 X |
| 5,108,048 | 4/1992 | Chang .................................... | 244/118.1 |
| 5,129,597 | 7/1992 | Manthey et al. . | |
| 5,395,074 | 3/1995 | Hart et al. . | |
| 5,422,794 | 6/1995 | Drake . | |
| 5,456,529 | 10/1995 | Cheung . | |
| 5,549,258 | 8/1996 | Hart et al. ............................. | 244/118.1 |
| 5,590,851 | 1/1997 | Ackerman . | |
| 5,716,027 | 2/1998 | Hart et al. ............................. | 244/118.1 |

FOREIGN PATENT DOCUMENTS

| | | |
|---|---|---|
| 0 279 620 A3 | 8/1988 | European Pat. Off. . |
| 0 311 771 A1 | 4/1989 | European Pat. Off. . |
| 0 348 130 A2 | 12/1989 | European Pat. Off. . |
| 0 614 806 A1 | 9/1994 | European Pat. Off. . |
| WO 90/08674 | 8/1990 | WIPO . |

OTHER PUBLICATIONS

O'Lone R.G., *Aviation Week & Space Technology*, pp. 32, 33 (Apr. 28, 1969).

*Primary Examiner*—William Grant
*Attorney, Agent, or Firm*—Christensen O'Connor Johnson & Kindness PLLC

[57] ABSTRACT

A removable stowage bin assembly for quick conversion of an aircraft between a passenger-carrying mode and a cargo-carrying mode includes a stowage bin and a first assembly comprised of a clevis fitting attached to the framework of the aircraft and a hook attached to the stowage bin, the hook being removably and pivotally attachable to the clevis fitting. A second assembly is comprised of a tie rod having a first end pivotally attached to the framework of the aircraft and a bracket attached to the stowage bin. The tie rod has a second end attachable to the framework of the aircraft in a cargo-carrying mode and attachable to the bracket on the stowage bin in a passenger-carrying mode. A third assembly is compromised of a female fitting having an opening and attached to one of the framework of the aircraft and the stowage bin, and a male fitting having a protrusion and attached to the other of the framework of the aircraft and the stowage bin. The protrusion of the male fitting is mateable in the opening of the female fitting in the passenger-carrying mode.

37 Claims, 8 Drawing Sheets

QUICK FIT OVERHEAD STOWAGE COMPARTMENT

FIELD OF THE INVENTION

The invention relates to overhead stowage bins used in aircraft for storing the carry-on luggage of passengers. More specifically, the invention provides a removable stowage bin assembly for quick conversion of an aircraft between a passenger-carrying mode and a cargo-carrying mode.

BACKGROUND OF THE INVENTION

Multi-use aircraft that can alternately carry either passengers or cargo have a flexibility that has the potential to increase the profitability of the aircraft. However, for this potential to be realized, the conversion of the aircraft between a passenger-carrying mode and a cargo-carrying mode must be quick and simple. When conversion from a passenger-carrying mode to a cargo-carrying mode is desired, the passenger seats, of course, must be removed. The cargo containers, or igloos, that are the standard in the aircraft industry have a cross-sectional silhouette that is contoured to the interior cross-sectional shape of a freighter aircraft's cargo hold in order to maximize the amount of cargo that can be transported in an igloo. Since freighter aircraft do not contain overhead stowage bins, the presence of overhead stowage bins in aircraft convertible between a passenger-carrying mode and a cargo-carrying mode prevent ingress of cargo igloos that have a cross-sectional area maximized based on the interior dimensions of freighter-only aircraft. Therefore, the stowage bins must be removed for use of a convertible aircraft in a cargo-carrying mode for loading the cargo igloos, and must, again, be reattached to the aircraft in the passenger-carrying mode.

A need exists for a removable stowage bin assembly for quick conversion of an aircraft between a passenger-carrying mode and a cargo-carrying mode having stowage bin structural supports that remain with the aircraft in both modes and that do not require labor intensive factory alignment and installation.

A need further exists for a removable stowage bin assembly for quick conversion of an aircraft between a passenger-carrying mode and a cargo-carrying mode in which, in the passenger-carrying mode, the stowage bin is fixed along all three of the major axes of the aircraft so that the stowage bin remains secure despite being subjected to dislodging forces generated by use and aircraft movement during passenger transport.

Finally, a need exists for a removable stowage bin assembly for quick conversion of an aircraft between a passenger-carrying mode and a cargo-carrying mode in which three distinct assemblies are employed to assure the stowage bin is secured against loading along each of the three major axes of the aircraft.

SUMMARY OF THE INVENTION

A removable stowage bin assembly for quick conversion of an aircraft between a passenger-carrying mode and a cargo-carrying mode includes a stowage bin and a first assembly comprises a clevis fitting attached to the framework of the aircraft and a hook attached to the stowage bin, the hook being removably and pivotally attachable to the clevis fitting. A second assembly comprises a tie rod having a first end pivotally attached to the framework of the aircraft and a bracket attached to the stowage bin. The tie rod has a second end attachable to the framework of the aircraft in a cargo-carrying mode and attachable to the bracket on the stowage bin in a passenger-carrying mode. A third assembly comprises a female fitting having an opening that can be attached to either of the framework of the aircraft or the stowage bin, and a male fitting having a protrusion and attached to the other of the framework of the aircraft and the stowage bin. The protrusion of the male fitting is mateable in the opening of the female fitting in the passenger-carrying mode.

In a preferred embodiment of the present invention, two tie rods are spaced apart on the framework of the aircraft to straddle the stowage bin, and one of the brackets is located on each end of the stowage bin to secure one of the tie rods in the passenger-carrying mode. Most preferably, a tie rod guide is located on each end of the stowage bin, and each tie rod guide comprises three tie rod guide channels that are arcuately arrayed on three tie rod guide portions. Each of the tie rod guide bases is angled with respect to each of the other tie rod guide bases to guide a tie rod upon pivotal movement of the stowage bin to attach the stowage bin to the aircraft framework upon conversion from the cargo-carrying mode to the passenger-carrying mode.

In another preferred embodiment of the present invention, a hook is located on each end of the stowage bin and a pair of clevis fittings are spaced apart on the frame of the aircraft for attachment of the hooks. The clevis fittings each preferably include a pin attached to a pair of clevis arms to form a clevis opening in which the hook is attachable. Most preferably, a resilient member borders the clevis opening and the hook has a neck and a pin recess such that the neck of the hook has a tolerance fit with the resilient member bordering the clevis opening, and the pin recess of the hook has a tolerance fit with the pin when the hook is inserted in the clevis opening and pivoted with respect to the clevis fitting to secure the stowage bin in the passenger-carrying mode.

In yet another preferred embodiment of the present invention, the female fitting is located on the framework of the aircraft and the male fitting is located on a face of the stowage bin that is abuttable with the framework of the aircraft. Most preferably, the opening of the female fitting is an elongate, vertically disposed channel and the protrusion of the male fitting is an elongate, vertically disposed rib mateable with the channel of the female fitting when the hooks on the stowage bin are pivoted upwardly within the clevis fittings to secure the stowage bin in the passenger-carrying mode.

In operation, the hooks of the stowage bin are attached to the clevis fittings on the framework of the aircraft by placing the pin recess of each hook over the pin of the aligned clevis fitting such that the hook projects into the clevis opening, whereby the stowage bin hangs vertically within the passenger compartment. An end of each of two tie rods is disconnected from the aircraft framework and the tie rods are pivoted downwardly. The stowage bin is then pivoted upwardly around the hooks while each of the two tie rods sequentially engages each of the three tie rod guide channels of a tie rod guide. As the stowage bin assembly is positioned substantially horizontally in the passenger compartment, the necks of the hooks attain a tolerance fit with the respective resilient members bordering the clevis openings, and the pin recesses of the hooks attain a tolerance fit with the respective pins. Substantially simultaneously, the elongate, vertically disposed channel of the female fitting that is located on the framework of the aircraft mates with the elongate, vertically disposed rib of the male fitting located on the face of the stowage bin that approaches the framework of the aircraft.

Finally, the tie rods are attached to the brackets on the ends of the stowage bin to complete the securing of the stowage bin in the passenger-carrying mode. The above procedure is reversed to configure the aircraft in the cargo-carrying mode.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Stowage Bin

Figure 1:
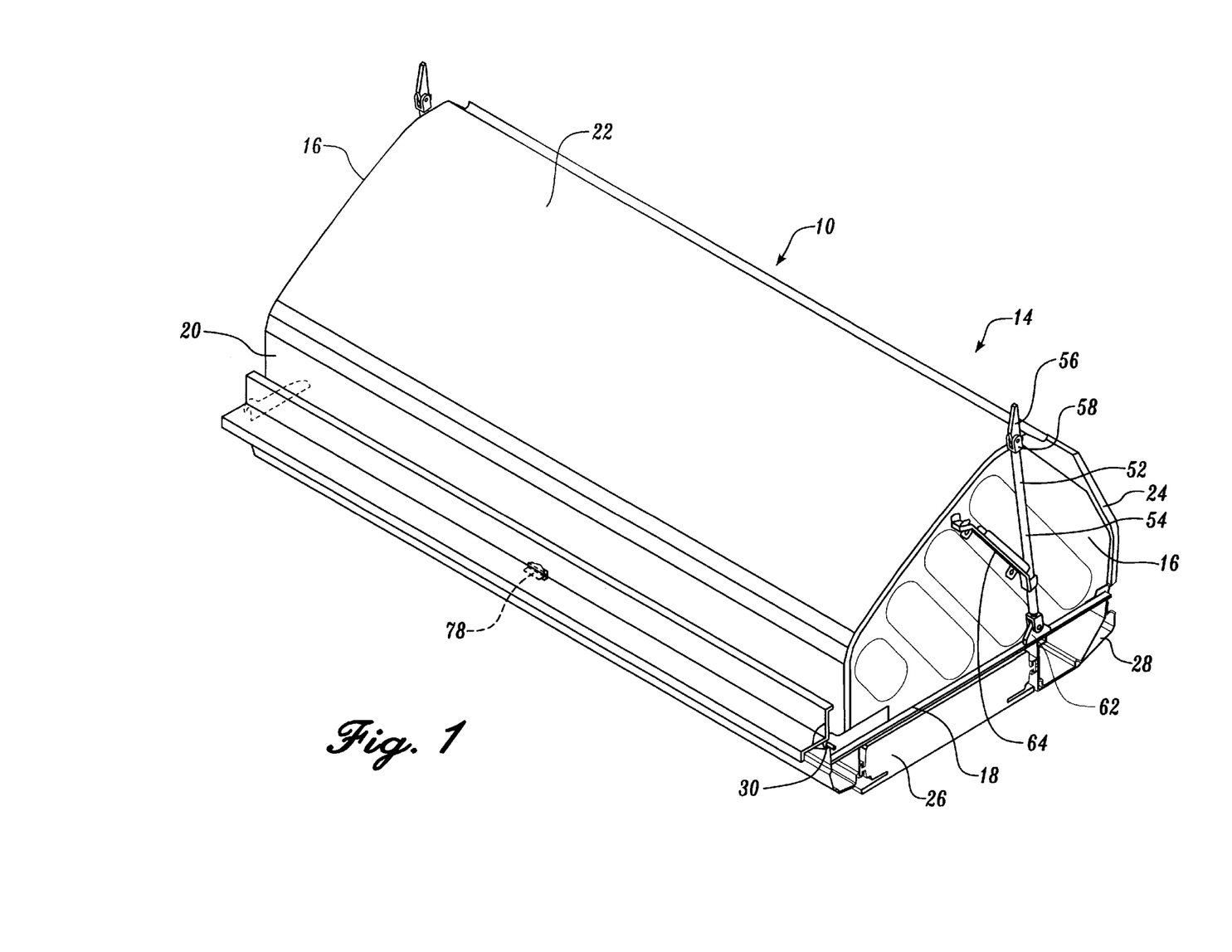
FIG. 1 is a perspective view of a removable stowage bin and associated attachment assemblies of the present invention and a portion of the aircraft framework to which the stowage bin is attached.
Figure 2:
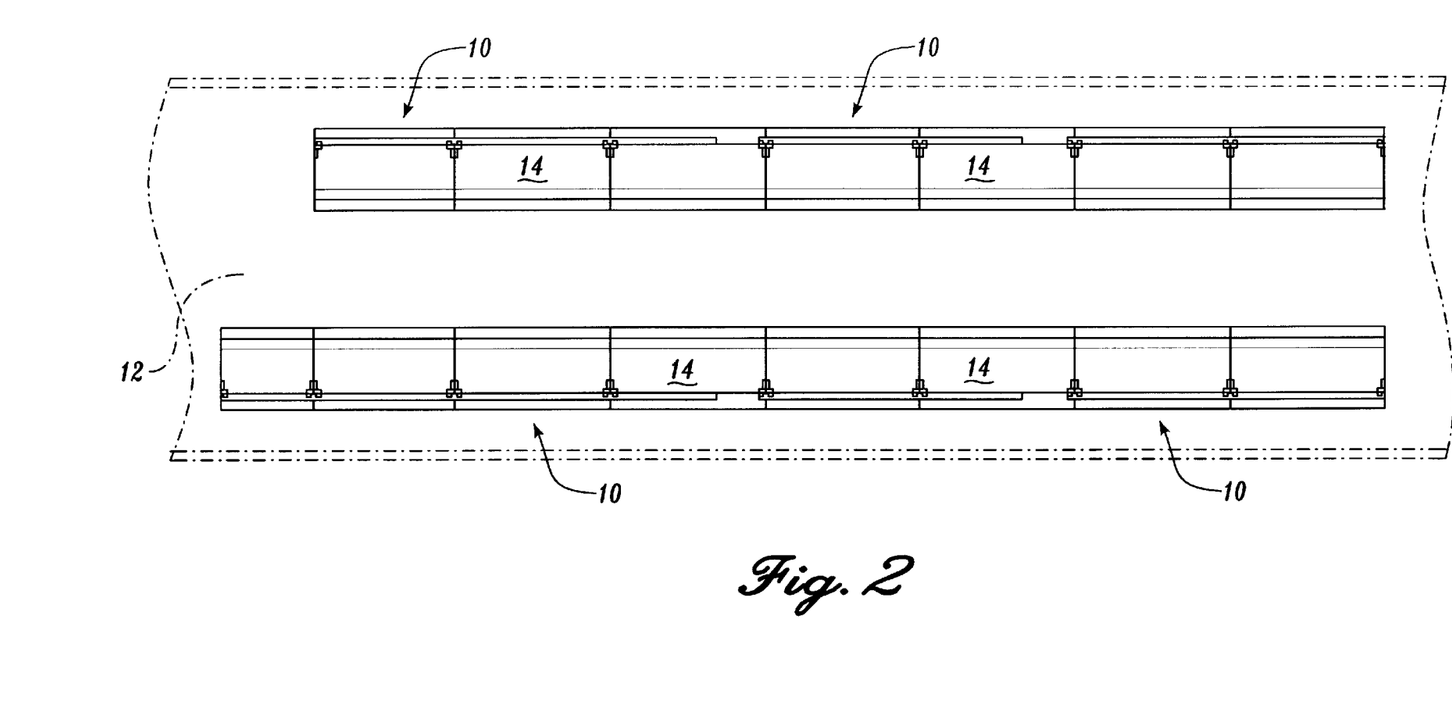
FIG. 2 is a schematic overhead view of a plurality of removable stowage bins and associated attachment assemblies of the present invention in an aircraft passenger compartment.

As shown in FIGS. 1 and 2, the present invention is a removable stowage bin assembly 10, a plurality of which can be longitudinally disposed along the interior of aircraft passenger compartment 12 in one or more linear arrays over the passenger seats (not shown) within aircraft passenger compartment 12. As more specifically shown in FIGS. 1 and 3, removable stowage bin assembly 10 includes stowage bin 14 having ends 16 which are orthogonally disposed with respect to both bin shelf panel 18 and bin back panel 20. Bin shelf panel 18 is substantially perpendicular to bin back panel 20. Bin top panel 22 is a planar member attached to the top of bin back panel 20 at an obtuse angle and extends inwardly and upwardly to terminate in an inward edge. Bin door 24 is swingably secured by a latch to the inner edge of bin shelf panel 18 in a conventional manner. Bin door 24 extends upwardly to a location adjacent the inner edge of bin top panel 22. Bin shelf panel 18, bin back panel 20, bin top panel 22, bin door 24, and ends 16 define the interior of bin 14, where luggage or the like is stored. Passenger service unit 26 which contains, for example, reading lights, air vents, emergency oxygen masks, and call buttons is mounted to the bottom of bin shelf panel 18. Bull nose 28 is mounted inwardly from service unit 26 to provide structural integrity to, and cosmetically finish, stowage bin 14.

Three distinct assemblies are preferably employed in the present invention to secure the stowage bin 14 in each of the three major load directions of the aircraft (fore-aft, inboard-outboard, and vertical). Each of these three assemblies will now be described in detail.

Clevis Fitting-Hook Assembly

Figure 7:
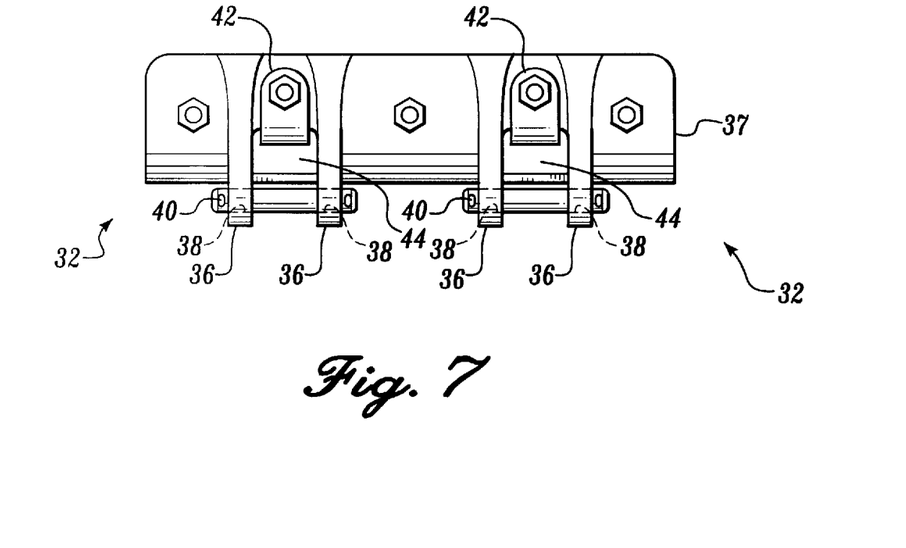
FIG. 7 is a front view of the clevis fitting of one of the attachment assemblies of the removable stowage bin assembly of the present invention.

Referring to FIGS. 1, 3, 7 and 8, clevis fitting-hook assembly 30 is comprised of clevis fitting 32 and hook 34. Clevis fitting 32 preferably includes a pair of laterally spaced clevis arms 36 that project outwardly from clevis body 37. Clevis body 37 is secured to longitudinal support rail 46 by attachment components known in the art, for example, bolts, screws, or rivets. Longitudinal support rail 46 is preferably located along the majority of the interior length of aircraft passenger compartment 12 and is conventionally secured to one of the frame attach fittings 47. Frame attach fitting 47 is connected to the interior framework 48 of the aircraft in a manner known in the art, for example, by bolts, screws, or rivets. As shown in FIG. 7, each clevis arm 36 has a coaxially aligned pin opening 38 through which pin 40 is placed to span clevis arms 36. Clevis opening 44 is defined by an opening in clevis body 37, and is vertically bounded on each side by clevis arms 36 and has an external perimeter horizontally formed by pin 40. Hook 34 is insertable in clevis opening 44, as further discussed below. Resilient member 42, which may be, for example, a synthetic polymer, wraps around the portion of clevis body 37 adjacent to clevis opening 44, and is located between clevis arms 36. FIG. 7 shows two joined clevis fittings 32, with each of the two clevis fittings 32 attachable to a different hook 34, the two hooks 34 attached to adjacent stowage bins 14. It will be understood that the invention also encompasses a single clevis fitting 32 attachable, for example, to a hook 34 located on an end stowage bin 14 in a series of stowage bins 14.

Figure 8:
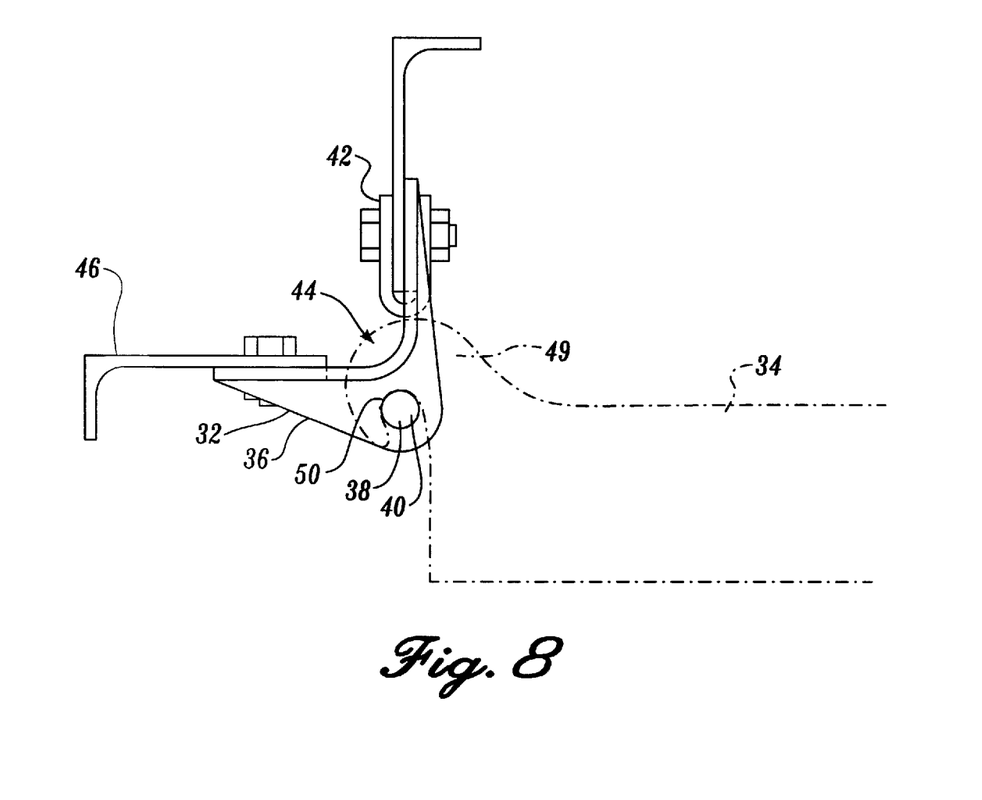
FIG. 8 is a sectional view of the clevis fitting and a phantom view of the hook removably and pivotally attachable to the clevis fitting that comprise one of the attachment assemblies of the removable stowage bin assembly of the present invention.

Hook 34 is attached in a manner known in the art by, for example, bolts, screws, or rivets, to the lower and outboard portion of end 16 of stowage bin 14 adjacent to the intersection of bin shelf panel 18 and bin back panel 20. Most preferably, one hook 34 is located on each end 16 of stowage bin 14 and two clevis fittings 32 are spaced on longitudinal support rail 46 a distance substantially equivalent to the width of stowage bin 14 such that each of the clevis fittings 32 are engageable with one of the hooks 34. Each hook 34 includes a neck 49 (the dorsal portion of hook 34) and a pin recess 50. Pin recess 50 is configured to receive pin 40 of clevis fitting 32. Neck 49 is an eccentric arcuate surface defined by a plurality of radii taken from the center of pin 40 that increase in length from the anterior end to the posterior end of hook 34. Hook 34 thus functions as a cam that contacts and deforms resilient member 42 when pivoted upwardly in clevis opening 44 to attach stowage bin 14 to the aircraft in the passenger-carrying mode of the aircraft. The neck 49 thus has a tolerance fit with resilient member 42 bordering clevis opening 44 and pin recess 50 has a tolerance fit with pin 40 of clevis fitting 32. The compression of resilient member 42 by neck 44 of hook 34 prevents vibration of, and associated noise emanating from, clevis fitting-hook assembly 30. In this manner, clevis fitting-hook assembly 30, when stowage bin 14 is secured to the aircraft in the passenger-carrying mode, prevents substantial movement in the inboard-outboard and vertical load directions, and allows only minimal movement in the fore-aft load direction.

Tie Rod Assembly

Figure 3:
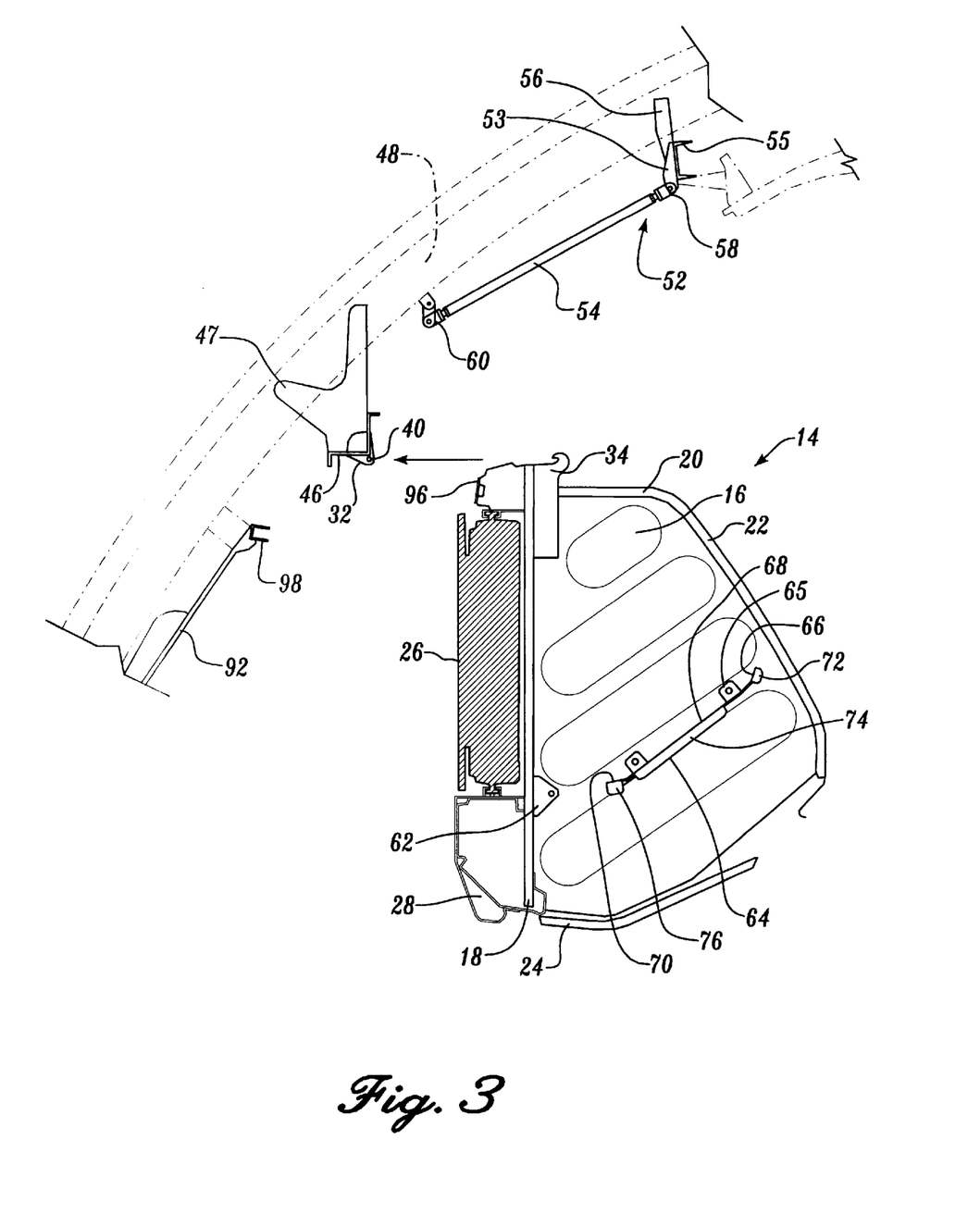
FIG. 3 is an end view of a stowage bin and associated attachment assemblies of the present invention and the aircraft framework employed for attachment.

Referring to FIG. 3, tie rod assembly 52 includes tie rod 54 which is pivotally connected at its upper end to rail attach bracket 53 by pivot connector 58. Upper support rail fitting 55 preferably spans a pair of aircraft frameworks 48 and is attached thereto by frame attach fitting 56, in a manner known in the art, for example, by bolts, screws or rivets. Rail attach bracket 53 and frame attach fitting 56 are attached in a manner known in the art, for example, by screws, bolts or rivets, to framework 48 and upper support rail fitting 55. The lower end of tie rod 54 is removably secured by, for example, a quick release pin, bolt or screw, to stowage fitting 60 that is mounted to framework 48 of the aircraft. Lower end of tic rod 54 is connected to stowage fitting 60 when tie rod 54 is in the stowed position. When tie rod 54 is disengaged from stowage fitting 60, tie rod 54 pivots around pivot connector 58, swings downwardly and inwardly and projects substantially perpendicular to the floor of the aircraft to attach to stowage bin 14 in a manner described below. Preferably, a pair of tie rods 54 are attached to framework 48 of the aircraft for each of stowage bins 14, and most preferably each pair of tie rods 54 are spaced a distance substantially equal to the width of stowage bin 14 to straddle the stowage bin 14 upon attachment thereto.

A tie rod bracket 62 is mounted on, and extends upwardly from, bin shelf panel 18. Tie rod bracket 62 receives the free end of tie rod 54 when tie rod 54 swings downwardly for stowage bin 14 to be secured to the aircraft in the passenger-carrying mode, as described in more detail below. Tie rod bracket 62 connects to tie rod 54 by an attachment device known in the art, for example, a quick release pin, bolt or screw. A tie rod guide 64 is attached to the face of each end 16 of stowage bin 14 by tie rod guide fasteners 65. Tie rod guide 64 most preferably includes three tie rod guide portions 66, 68, and 70 respectively. The three tie rod guide portions 66, 68, and 70 are preferably angled with respect to each other such that an obtuse angle is formed between tie rod guide portions 66 and 68 as well as between tie rod guide portions 68 and 70. Each of tie rod guide portions 66, 68, and 70 has an elongate, walled tie rod guide channel 72, 74, and 76, respectively, thereon. The longitudinal axis of the tie rod guide channel 74 is preferably substantially perpendicular to bin top panel 22 and the longitudinal axis of tie rod guide channel 76 is preferably substantially perpendicular to bin shelf panel 18. Tie rod guide channels 72, 74, and 76 are arcuately arrayed along tie rod guide 64 due to the obtuse angle between adjoining tie rod guide portions such that, as will be described in further detail below, tie rod 54 sequentially engages each of tie rod guide channels 72, 74, and 76 as stowage bin 14 is pivoted upwardly to be secured in the passenger-carrying mode of the aircraft. Thus, tie rod assembly 52 secures stowage bin 14 in the vertical load direction when the aircraft is in the passenger-carrying mode.

Centering and Forward Load Carrying Assembly

Figure 9:
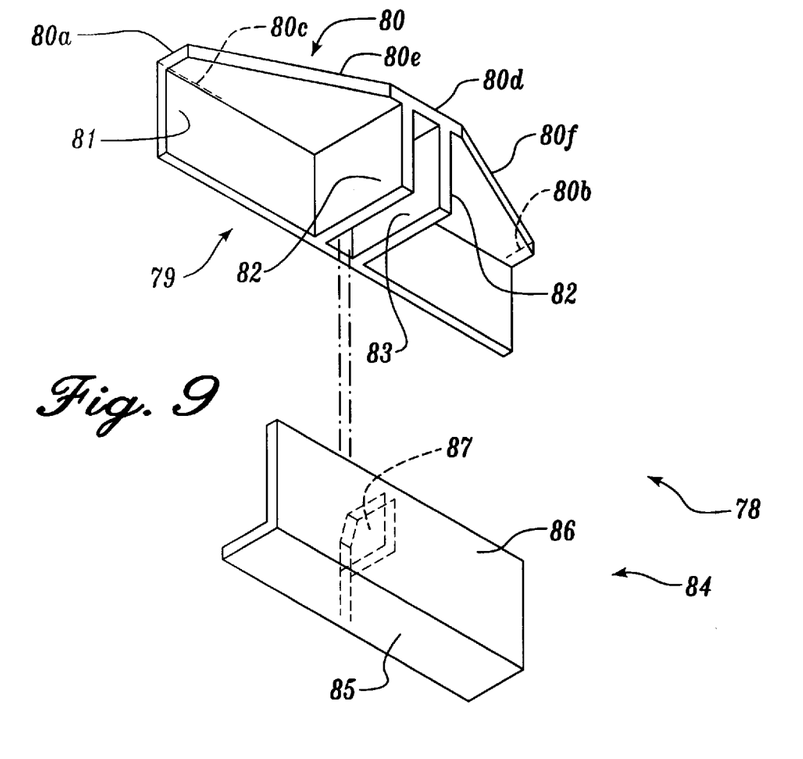
FIG. 9 is a perspective view of the female fitting located on the framework of the aircraft and the male fitting on the removable stowage bin with which the female fitting mates to comprise another one of the attachment assemblies of the removable stowage bin assembly of the present invention.
Figure 10:
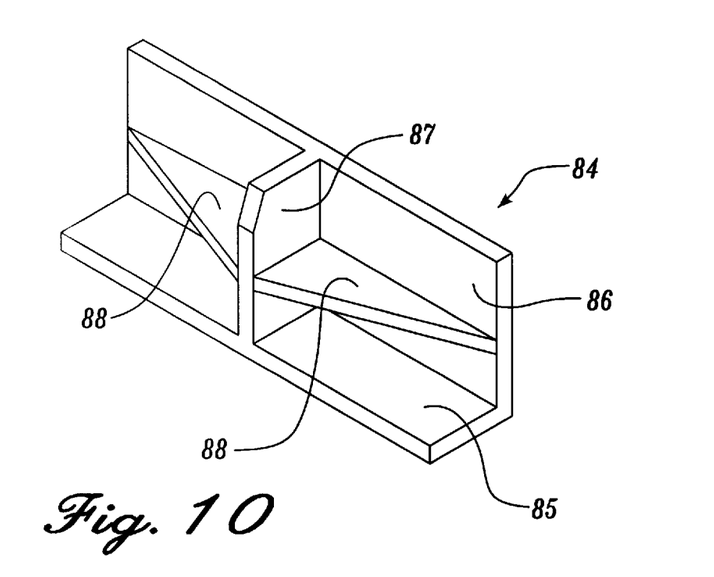
FIG. 10 is a perspective view of the male fitting of FIG. 9.

Referring to FIGS. 1, 9, and 10, the centering and forward load carrying assembly 78 includes a female fitting 79 that is preferably attached to longitudinal support rail 46 at a location approximately equidistant from each of the clevis fittings 32 employed to secure stowage bin 14. Female fitting 79 has a top 80 that is a planar, six-sided structure best described as an initially triangular structure in which the apex of each end has been truncated. Top 80 is thus a polyhedron having two parallel sides 80a and 80b; a base 80c perpendicular to, and joined to, each of the sides 80a and 80b; a truncated apex 80d parallel with base 80c and perpendicular to sides 80a and 80b; and two angled faces 80e and 80f that join truncated apex 80d to sides 80a and 80b, respectively. Back 81 is a planar, rectangular member attached orthogonally to top 80. Two parallel channel walls 82 are attached orthogonally to both top 80 and back 81 to form an elongate vertically disposed channel 83.

Referring to FIG. 10, male fitting 84 is preferably secured to bin back panel 20 and bin shelf panel 18 at a location that substantially bisects the length of stowage bin 14 so that male fitting 84 is mateable with female fitting 79 when stowage bin 14 is rotated upwardly to be attached to the aircraft. Male fitting 84 preferably includes a rectangular base 85 and a rectangular back 86 that is orthogonally disposed to base 85. Elongate vertically disposed rib 87 is a substantially rectangular structure that bisects, and is orthogonal with respect to, both base 85 and back 86. Rib 87 is bisected by wings 88, triangular members that are orthogonal to rib 87 and back 86, parallel to base 85 and attached to back 86. Elongate, vertically disposed rib 87 of male fitting 84 is configured to mate with elongate, vertically disposed channel 83 of female fitting 79 when bin 14 is rotated upwardly as bin back panel 20 approaches longitudinal support rail 46 to center stowage bin 14 to longitudinal support rail 46 when the aircraft is configured in the passenger-carrying mode.

Centering and forward load carrying assembly 78 prevents substantial movement of stowage bin 14 in the fore-aft load direction when stowage bin 14 is secured to the aircraft when the aircraft is configured in the passenger-carrying mode.

Attachment/Detachment

Figure 4:
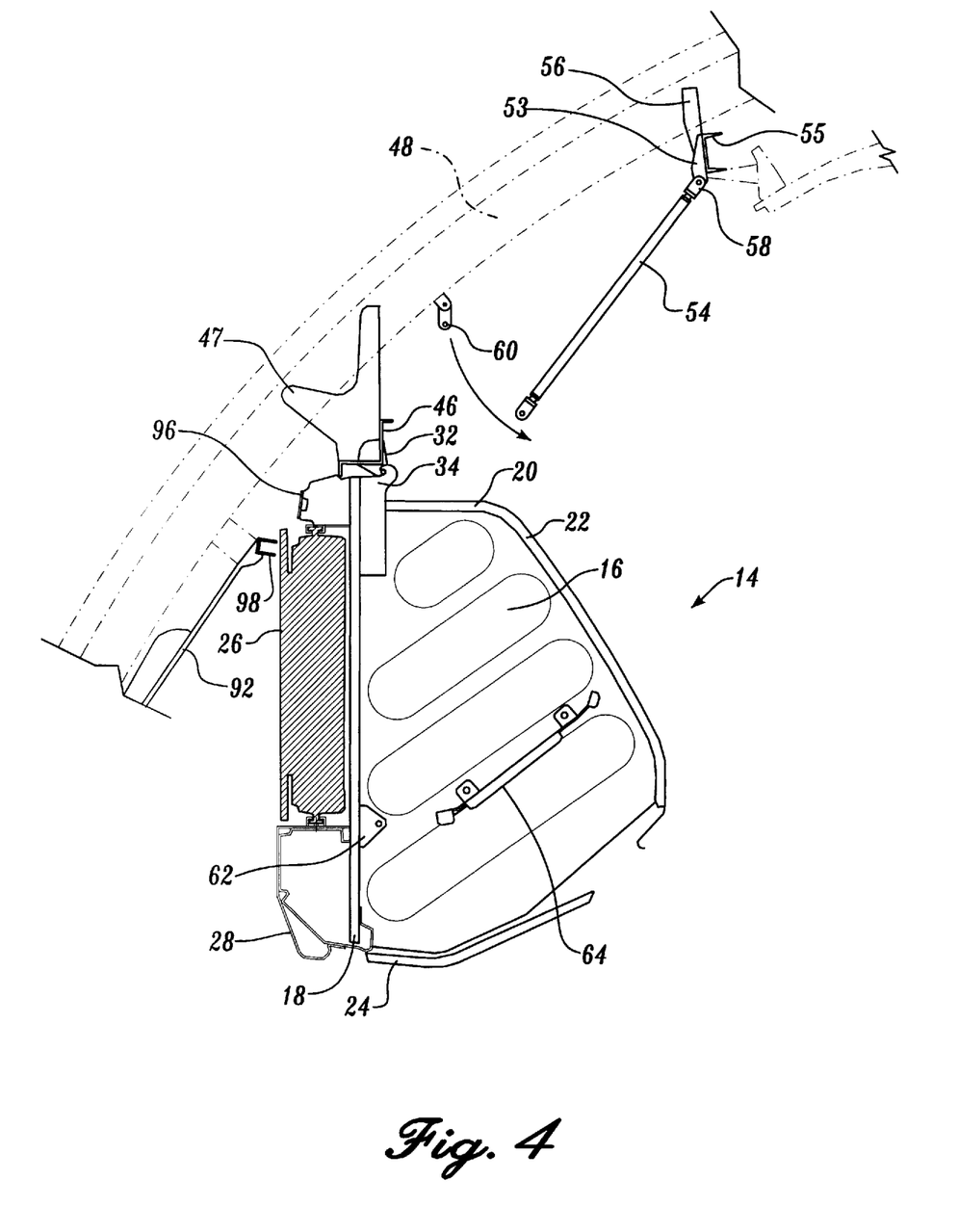
FIG. 4 is a first end view of the attachment sequence employed with the removable stowage bin and associated attachment assemblies of the present invention.

Attachment of stowage bin 14 to, and detachment from, the aircraft employing removable stowage bin assembly 10 will now be described referring to FIG. 4, FIG. 5, and FIG. 6. First referring to FIG. 4, to secure stowage bin 14 to the aircraft, hooks 34 of stowage bin 14 are attached to clevis fittings 32 on longitudinal support rail 46 of the aircraft by placing pin recess 50 of each hook 34 over pin 40 of the aligned clevis fitting 32 such that hook 34 projects into clevis opening 44 whereby stowage bin 14 hangs substantially vertically within aircraft passenger compartment 12. Tie rod 54 is disconnected from tie rod bracket 60 and tie rod 54 pivots downwardly and inwardly around pivot connector 58 attached to frame attach fitting 56 so that tie rod 54 projects substantially vertically within aircraft passenger compartment 12.

Figure 5:
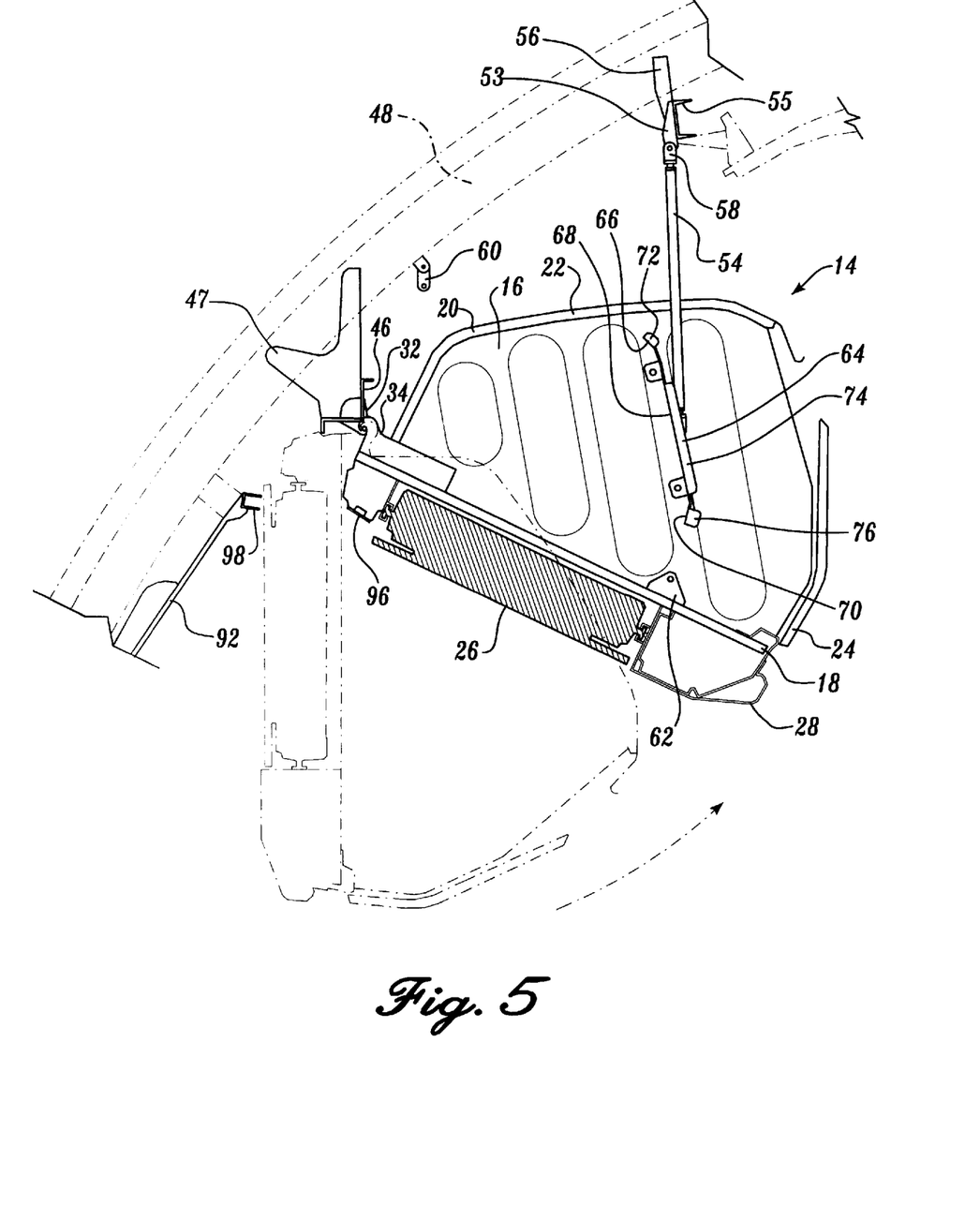
FIG. 5 is a second end view of the attachment sequence employed with the removable stowage bin and associated attachment assemblies of the present invention.
Figure 6:
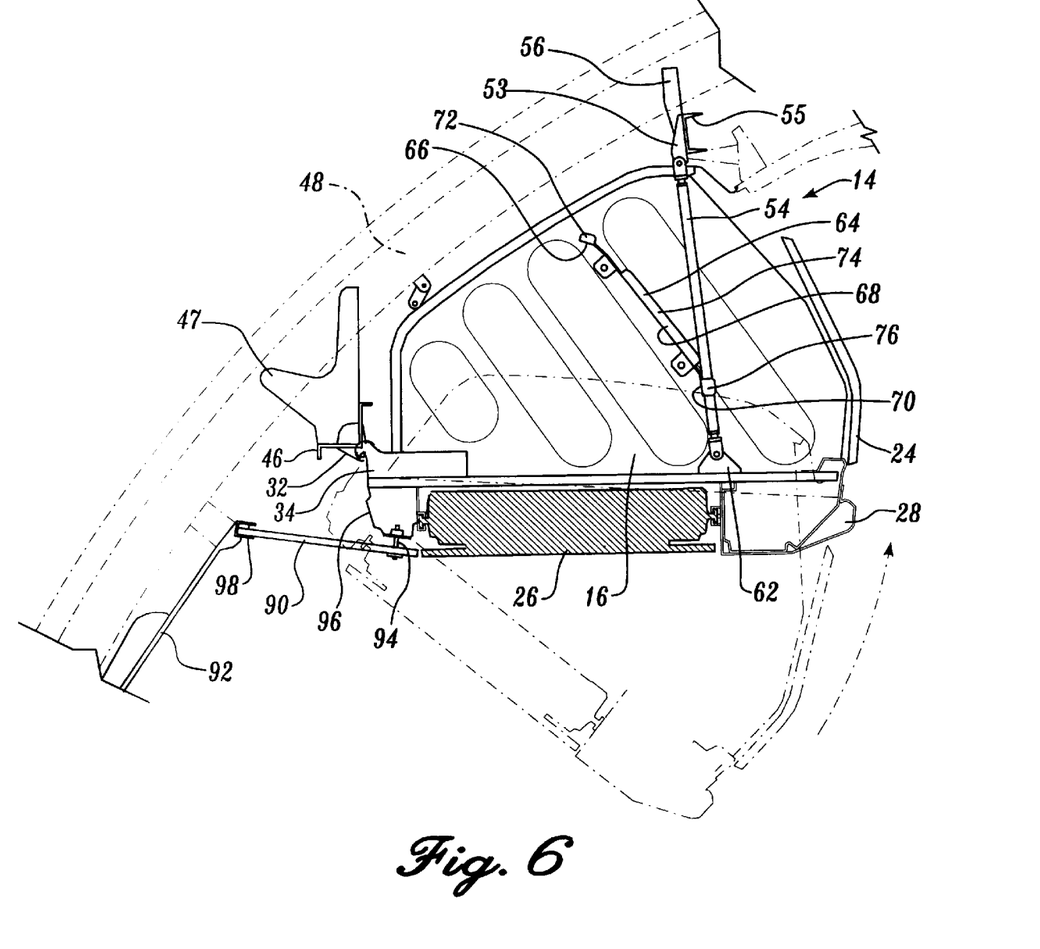
FIG. 6 is a third end view of the attachment sequence employed with the removable stowage bin and associated attachment assemblies of the present invention.

Now referring to FIG. 5, FIG. 7 and FIG. 8, stowage bin 14 is pivoted upwardly around each hook 34 and each tie rod 54 first enters and passes through tie rod guide channel 72 of tie rod guide 64 and next enters anti passes through tie rod guide channel 74 of tie rod guide 64. As stowage bin 14 pivot upwardly, each tie rod 54 thus maintains a substantially vertical orientation while interconnected with a tie rod guide channel 76 that alleviates the need for manual positioning of tie rod 54. The pivotal movement of stowage bin 14 causes each hook 34 to pivot around on aligned pin 40.

The increasing width of hook 34 from the anterior and to the posterior end of hook 34 due to the eccentric arcuate surface of neck 49 causes hook 34 to function as a cam as it is pivoted in clevis opening 44 to increasingly deform resilient member 42 adjacent clevis opening 44 for a secure fit between hook 34 and clevis fitting 32.

Referring to FIG. 6 through FIG. 10, as stowage bin 14 attains a substantially horizontal position in aircraft passenger compartment 12, the neck 49 of each hook 34, due to the above described camming of hook 34, attains a tolerance fit with a resilient member 42 bordering a clevis opening 44, and a pin recess 50 of each hook 34 attains a tolerance fit with a pin 40 of a clevis fitting 32. Substantially simultaneously, the elongate, vertically disposed channel 83 of the female fitting 80 that is located on longitudinal support rail 46 of the aircraft mates with the elongate, vertically disposed rib 87 of the male fitting 84 located on bin shelf panel 18 and bin back panel 20 that now approaches longitudinal support rail 46 of the aircraft to center bin 14 with respect to the aircraft. Tie rods 54, after passing through tie rod guide channel 76 of tie rod guide 64, are attached to a tie rod bracket 62 on each end 16 of stowage bin 14 with the quick release pin or the like that initially attached tie rod 54 to stowage fitting 60. Finally, closure panel 90 is attached to stowage bin 14 and aircraft sidewall panel 92 by first inserting an end of closure panel 90 in closure channel 98 adjacent to aircraft sidewall panel 92 and then securing closure panel 90 with closure panel attachment mechanism 94, which may be, for example, a screw or bolt, to closure panel bracket 96 of stowage bin 14. The above procedure is reversed to configure the aircraft in the cargo-carrying mode by removal of stowage bin 14.

The above description shows certain assemblies attaches to certain structures. For example, clevis fitting 32 is attached to longitudinal support rail 46, hook 34 is attached to stowage bin 14, tie rod 54 is attached to rail attach bracket 53, tie rod bracket 62 is attached to stowage bin 14, female fitting 79 is attached to longitudinal support rail 49 and male fitting 84 is attached to stowage bin 14. However, the location of an assembly can be switched to the counterpart structure on which its complementary assembly is located in the above description. Additionally, the assemblies attached to longitudinal support rail 46, rail attach bracket 53, or upper support rail fitting 55, for example, can be secured directly to aircraft framework 48.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A removable stowage bin assembly for quick conversion of an aircraft between a passenger-carrying mode and a cargo-carrying mode, the assembly comprising:
   a stowage bin;
   a first assembly including at least one clevis fitting attached to framework of the aircraft and at least one hook attached to the stowage bin, the hook being removably and pivotally attachable to the clevis fitting;
   a second assembly including at least one tie rod having a first end pivotally attached to framework of the aircraft and including at least one bracket attached to the stowage bin, the tie rod having a second end attachable to framework of the aircraft when in a cargo-carrying mode and attachable to the bracket on the stowage bin when in a passenger-carrying mode; and
   a third assembly including a fitting on the stowage bin mateable with a fitting on framework of the aircraft when in a passenger carrying mode, such that the first assembly, the second assembly and the third assembly prevent substantial movement of the stowage bin along longitudinal, lateral or vertical axes of the aircraft.

2. The assembly of claim 1, wherein the fitting on the stowage bin and the fitting on framework of the aircraft of the third assembly comprise:
   a female fitting having an opening and attached to one of framework of the aircraft and the stowage bin; and
   a male fitting having a protrusion and attached to the other one of framework of the aircraft and the stowage bin, the protrusion of the male fitting being mateable in the opening of the female fitting.

3. The assembly of claim 2, wherein the female fitting is located on framework of the aircraft, the stowage bin has a face locatable adjacent framework of the aircraft, and the male fitting is located on the face of the stowage bin.

4. The assembly of claim 2, wherein the opening of the female fitting is an elongate vertically disposed channel and the protrusion of the male fitting is an elongate vertically disposed rib mateable with the channel when the hook of the first assembly is pivoted with respect to the clevis fitting to secure the stowage bin when in the passenger-carrying mode.

5. The assembly of claim 1, wherein the stowage bin has two ends, a pair of the tie rods are spaced apart on framework of the aircraft to straddle the stowage bin, and one of the brackets is located on each of the ends of the stowage bin.

6. The assembly of claim 1, wherein the stowage bin has two ends and a tie rod guide is located on each end, each tie rod guide having at least one tie rod guide channel adapted to receive a respective tie rod.

7. The assembly of claim 6, wherein each of the tie rod guides has three tie rod guide channels arcuately arrayed on three tie rod guide portions that are angled with respect to each other to guide each of the tie rods upon pivotal movement of the stowage bin.

8. The assembly of claim 1, wherein the stowage bin has two ends, one of the hooks is located on each of the ends of the stowage bin, and a pair of the clevis fittings are spaced apart on framework of the aircraft for attachment of the hooks.

9. The assembly of claim 1, wherein the clevis fitting includes a pin attached to a pair of clevis arms to form a clevis opening in which the hook is attachable.

10. The assembly of claim 9, further comprising a resilient member bordering the clevis opening and wherein the hook has a neck and a pin recess such that the neck of the hook has a tolerance fit with the resilient member and the pin recess of the hook has a tolerance fit with the pin when the hook is inserted in the clevis opening and pivoted with respect to the clevis fitting to secure the stowage bin when in a passenger-carrying mode.

11. A removable stowage bin assembly for quick conversion of an aircraft between a passenger-carrying mode and a cargo-carrying mode, the assembly comprising:
   a stowage bin;
   a first assembly including at least one clevis fitting attached to framework of the aircraft and at least one hook attached to the stowage bin, the hook being removably and pivotally attachable to the clevis fitting; and
   a second assembly including at least one tie rod having a first end pivotally attached to framework of the aircraft and including at least one bracket attached to the stowage bin, the tie rod having a second end attachable to framework of the aircraft when in a cargo-carrying mode and attachable to the bracket on the stowage bin when in a passenger-carrying mode, and a tie rod guide on the stowage bin, the tie rod guide having at least one tie rod guide channel adapted to receive the tie rod such that the first assembly and the second assembly prevent substantial movement of the stowage bin along longitudinal, lateral or vertical axes of the aircraft.

12. The assembly of claim 11, further comprising:
a third assembly including a female fitting having an opening and attached to one of framework of the aircraft and the stowage bin and including a male fitting having a protrusion and attached to the other one of framework of the aircraft and the stowage bin, the protrusion of the male fitting being mateable in the opening) of the female fitting.

13. The assembly of claim 12, wherein the female fitting is located on framework of the aircraft, the stowage bin has a face locatable adjacent framework of the aircraft, and the male fitting is located on the face of the stowage bin.

14. The assembly of claim 12, wherein the opening of the female fitting is an elongate vertically disposed channel and the protrusion of the male fitting is an elongate vertically disposed rib mateable with the channel when the hook of the first assembly is pivoted with respect to the clevis fitting to secure the stowage bin when in a passenger-carrying mode.

15. The assembly of claim 11, wherein the stowage bin has two ends, a pair of the tie rods are spaced apart on framework of the aircraft to straddle the stowage bin, and one of the brackets is located on each of the ends of the stowage bin.

16. The assembly of claim 11, wherein the stowage bin has two ends and a tie rod guide is located on each end.

17. The assembly of claim 16, wherein each of the tie rod guides has three tie rod guide channels arcuately arrayed on three tie rod guide portions that are angled with respect to each other to guide each of the tie rods upon pivotal movement of the stowage bin.

18. The assembly of claim 11, wherein the stowage bin has two ends, one of the hooks is located on each of the ends of the stowage bin, and a pair of the clevis fittings are spaced apart on framework of the aircraft for attachment of the hooks.

19. The assembly of claim 11, wherein the clevis fitting includes a pin attached to a pair of clevis arms to form a clevis opening in which the hook is attachable.

20. The assembly of claim 19, further comprising a resilient member bordering the clevis opening and wherein the hook has a neck and a pin recess such that the neck of the hook has a tolerance fit with the resilient member and the pin recess of the hook has a tolerance fit with the pin when the hook is inserted in the clevis opening and pivoted with respect to the clevis fitting to secure the stowage bin when in a passenger-carrying mode.

21. A removable stowage bin assembly for quick conversion of an aircraft between a passenger-carrying mode and a cargo-carrying mode, the assembly comprising:
a stowage bin;
a first assembly including at least one clevis fitting attached to framework of the aircraft and at least one hook attached to the stowage bin, the clevis fitting including a pin attached to a pair of clevis arms to form a clevis opening in which the hook is attachable, the hook having a neck and a pin recess such that the neck of the hook has a tolerance fit with the clevis opening and the pin recess of the hook has a tolerance fit with the pin when the hook is inserted in the clevis opening and pivoted with respect to the clevis fitting to secure the stowage bin when in a passenger carrying mode; and
a second assembly including at least one tie rod having a first end pivotally attached to framework of the aircraft and including at least one bracket attached to the stowage bin, the tie rod having a second end attachable to framework of the aircraft in a cargo-carrying mode and attachable to the bracket on the stowage bin when in a passenger-carrying mode, such that the first assembly and the second assembly prevent substantial movement of the stowage bin along longitudinal, lateral or vertical axes of the aircraft.

22. The assembly of claim 21, further comprising:
a third assembly including a female fitting having an opening and attached to one of framework of the aircraft and the stowage bin and including a male fitting having a protrusion and attached to the other one of framework of the aircraft and the stowage bin, the protrusion of the male fitting being mateable in the opening of the female fitting.

23. The assembly of claim 22, wherein the female fitting is located on framework of the aircraft, the stowage bin has a face locatable adjacent framework of the aircraft, and the male fitting is located on the face of the stowage bin.

24. The assembly of claim 22, wherein the opening of the female fitting is an elongate vertically disposed channel and the protrusion of the male fitting is an elongate vertically disposed rib mateable with the channel when the hook of the first assembly is pivoted with respect to the clevis fitting to secure the stowage bin when in a passenger-carrying mode.

25. The assembly of claim 21, wherein the stowage bin has two ends, a pair of the tie rods are spaced apart on framework of the aircraft to straddle the stowage bin, and one of the brackets is located on each of the ends of the stowage bin.

26. The assembly of claim 21, wherein the stowage bin has two ends and a tie rod guide is located on each end.

27. The assembly of claim 26, wherein each of the tie rod guides has three tie rod guide channels arcuately arrayed on three tie rod guide portions that are angled with respect to each other to guide each of the tie rods upon pivotal movement of the stowage bin.

28. The assembly of claim 21, wherein the stowage bin has two ends, one of the hooks is located on each of the ends of the stowage bin, and a pair of the clevis fittings are spaced apart on framework of the aircraft for attachment of the hooks.

29. A removable stowage bin assembly for quick conversion of an aircraft between a passenger-carrying mode and a cargo-carrying mode, the assembly comprising:
a stowage bin;
at least one first assembly including a clevis fitting attached to framework of the aircraft and at least one hook attached to the stowage bin, the hook being removably and pivotally attachable to the clevis fitting;
a second assembly including at least one tie rod having a first end pivotally attached to framework of the aircraft and including at least one bracket attached to the stowage bin, the tie rod having a second end attachable to framework of the aircraft when in a cargo-carrying mode and attachable to the bracket on the stowage bin when in a passenger-carrying mode; and
a third assembly including a female fitting having an opening and attached to one of framework of the aircraft and the stowage bin, and a male fitting having a protrusion and attached to the other of framework of the aircraft and the stowage bin, the protrusion of the male fitting being mateable in the opening of the female fitting such that the first assembly, the second assembly and the third assembly prevent substantial movement of the stowage bin along longitudinal, lateral or vertical axes of the aircraft.

30. The assembly of claim 29, wherein the stowage bin has two ends, a pair of the tie rods are spaced apart on a framework of an aircraft to straddle the stowage bin, and one of the brackets is located on each of the ends of the stowage bin.

31. The assembly of claim 29, wherein the stowage bin has two ends and a tie rod guide is located on each end.

32. The assembly of claim 31, wherein each of the tie rod guides has three tie rod guide channels arcuately arrayed on three tie rod guide portions that are angled with respect to each other to guide each of the tie rods upon pivotal movement of the stowage bin.

33. The assembly of claim 29, wherein the stowage bin has two ends, one of the hooks is located on each of the ends of the stowage bin, and a pair of the clevis fittings are spaced apart on framework of the aircraft for attachment of the hooks.

34. The assembly of claim 29, wherein the clevis fitting includes a pin attached to a pair of clevis arms to form a clevis opening in which the hook is attachable.

35. The assembly of claim 34, further comprising a resilient member bordering the clevis opening and wherein the hook has a neck and a pin recess such that the neck of the hook has a tolerance fit with the resilient member and the pin recess of the hook has a tolerance fit with the pin when the hook is inserted in the clevis opening and pivoted with respect to the clevis fitting to secure the stowage bin when in a passenger-carrying mode.

36. The assembly of claim 29, wherein the female fitting is located on framework of the aircraft, the stowage bin has a face locatable adjacent framework of the aircraft, and the male fitting is located on the face of the stowage bin.

37. The assembly of claim 29, wherein the opening of the female fitting is an elongate vertically disposed channel and the protrusion of the male fitting is an elongate vertically disposed rib mateable with the channel when the hook of the first assembly is pivoted with respect to the clevis fitting to secure the stowage bin when in a passenger-carrying mode.

* * * * *

UNITED STATES PATENT AND TRADEMARK OFFICE
CERTIFICATE OF CORRECTION

PATENT NO. : 5,842,668
DATED : December 1, 1998
INVENTOR(S) : M.C. Spencer

It is certified that error appears in the above-indentified patent and that said Letters Patent is hereby corrected as shown below:

COLUMN      LINE

9               18          After "opening" delete ")"
(Claim 12, line 8)

10              55          "at least one first assembly including a clevis" should
(Claim 29, line 5)          read --a first assembly including at least one clevis--

Signed and Sealed this

Fifteenth Day of June, 1999

*Attest:*

Q. TODD DICKINSON

*Attesting Officer*        *Acting Commissioner of Patents and Trademarks*